United States Patent Office 3,362,963
Patented Jan. 9, 1968

3,362,963
POLYFLUORO-OXETENES AND
DERIVATIVES THEREOF
Cyril Woolf, Morristown, N.J., and Jerome Hollander, San Diego, Calif., assignors to Allied Chemical Corporation, New York, N.Y., a corporation of New York
No Drawing. Filed Oct. 27, 1964, Ser. No. 406,882
3 Claims. (Cl. 260—333)

ABSTRACT OF THE DISCLOSURE 2,2-bis(perhalofluoromethyl)-3,4-difluoro oxetenes prepared by subjecting a 2,2-bis(perhalofluoromethyl)-3,4-difluoro-3,4-dihalo-oxetane to a reducing agent or 2,2-bis(perhalofluoromethyl) - 3,4-difluoro-4-halo-oxetane to a strong base. The oxetenes form adducts with normal alkanes of 3 to 14 carbon atoms which are useful as lubricants and as solvents and/or plasticizers.

---

This invention relates to new 2,2-bis(perhalofluoromethyl)-1,3 difluoro-oxetenes, to a process for preparing them, and to useful derivatives thereof.

It is known to prepare polyfluoro-oxetanes by the reaction of fluoroperhalo ethylenes with fluoroperhalo acetones. These oxetanes, particularly the 2,2-bis(trifluoromethyl)-3,4-tetrahalo oxetanes described in copending application of Melvin M. Schlechter and Cyril Woolf, Ser. No. 276,985, filed Apr. 30, 1963, are extremely unreactive, thermally stable compounds useful as heat transfer agents, hydraulic fluids, and the like.

It would be desirable in many cases to introduce such stable non-reactive moieties into various chemical structures to produce compounds which retain their own valuable properties while sharing the unique properties of the fluoro-oxetanes. This has heretofore appeared to be impossible, however, due to the chemical non-reactivity of the oxetanes, and the fact that the 3,4-dibromo- and 3,4-diiodo-substituted oxetanes, which would be useful in the preparation of Grignard reagents capable of reaction with other compounds, cannot be prepared by the prior art processes.

It is an object of the present invention to provide a group of reactive compounds useful in introducing polyfluoro-oxetane moieties into various structures.

Another object of the invention is to provide new 2,2-bis(perhalofluoromethyl)-3,4-difluoro oxetenes of the formula

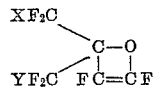

wherein X and Y may be the same or different and represent chlorine or fluorine.

A further object of the invention is to provide the 3,4-dibromo- and 3,4-diiodo-oxetane derivatives of the above fluoro-oxetenes.

A still further object of the invention is to provide new high boiling mutual solvents derived from the aforesaid oxetenes capable of dissolving both hydrocarbons and fluorocarbons.

These and other objects are accomplished according to our invention by the production of the extremely reactive polyfluoro-oxetenes of the formula set forth above, and by reaction of these oxetenes with appropriate reagents to produce the useful derivatives described.

The new 2,2 - bis(fluoroperhalomethyl) - 3,4-difluoro-oxetenes of our invention are prepared by the dehalogenation or dehydrohalogenation of 2,2-bis(fluoroperhalomethyl)-3,4-difluoro-3,4-disubstituted oxetanes according to the following equation:

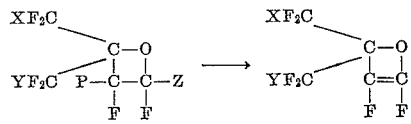

wherein X and Y may be the same or different and represent chlorine or fluorine; Z represents fluorine, chlorine, or bromine; and P represents hydrogen or chlorine.

The 2,2-bis(fluoroperhalomethyl)-3,4-tri- or tetrahalo-oxetanes used as starting materials in our process may be prepared by reaction of the corresponding fluoroacetone with a fluoroethylene as described in copending application to Melvin M. Schlechter and Cyril Woolf above referred to, as illustrated in the equation below:

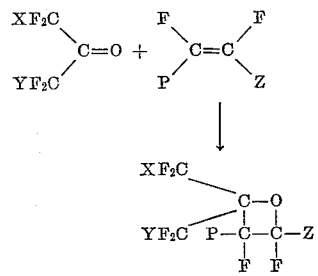

wherein X, Y, P, and Z are as defined above.

Suitable oxetane starting materials therefore include:

2,2-bis(trifluoromethyl)-3,4-difluoro-3,4-dichloro-oxetane
2,2-bis(chlorodifluoromethyl)-3,4-difluoro-3,4-dichloro-oxetane
2-trifluoromethyl-2-chlorodifluoromethyl-3,4-difluoro-3,4-dichloro-oxetane
2,2-bis(trifluoromethyl)-3,4-difluoro-3-chloro-4-bromo-oxetane
2,2-bis(trifluoromethyl)-3,4-difluoro-4-chloro-oxetane
2,2-bis(trifluoromethyl)-3,4-trifluoro-3-chloro-oxetane In carrying out the process according to our invention when a 2,2-bis(fluoroperhalomethyl)-3,4-difluoro-3,4-dihalo oxetane is used as starting material, the oxetane is dehalogenated by suitable means to remove a single halogen from each of the 3 and 4 crabon atoms, forming a double bond at the site. Dehalogenation can be effected by any desired means, suitably by subjecting the oxetane to the action of a reducing agent such as hydrogen or an electropositive metal which is above chlorine in the electromotive table of the elements.

In a preferred procedure, dehalogenation is effected by dissolving the oxetane in a solvent such as an alcohol, dioxane, tetrahydrofuran, or the like, and adding the solution slowly to a suspension of zinc. The zinc is preferably in finely divided form, and if desired, the suspension may contain small amounts of activators such as cupric chloride, zinc chloride, iodine, hydrochloric acid, or the like. The dehalogenation reaction proceeds readily at normal room temperatures, (e.g. about 20° C.) but may suitably be carried out at elevated temperatures up to the boiling point of the solvent, or higher if pressure is used. Under atmospheric conditions, temperatures between about 20° C. and about 100° C. are suitable. The dehalogenation reaction can be carried out either in batch fashion under reflux conditions, or it may be carried out continuously, and the product may be continuously distilled out through a fractionating column.

Alternatively, dehalogenation may be carried out in the vapor phase by passing a mixture of the vaporized oxetane and hydrogen over a carbon/palladium catalyst at temperatures between about 150° C. and about 300° C., using a stoichiometric deficiency of hydrogen.

Other methods known to the art for dehalogenating vicinal dihalo compounds may be employed.

When the starting oxetane is a 2,2-bis(fluoroperhalomethyl)-2,3-difluoro-2-halo-oxetane, i.e., in the case where P is hydrogen, the oxetane is dehydrohalogenated as by heating it with an aqueous solution of a strong base, such as sodium hydroxide at temperatures between about 30° C. and about 100° C. or by thermal cracking, e.g., by vaporizing the compound and passing it through a hot tube at about 250° C. to about 500° C.

The resulting polyfluoro-oxetenes are extremely reactive compounds having their reactive site primarily at the double bond. As a result, it is possible to add numerous chemical addenda across the double bond. Thus bromine and iodine add in this fashion across the double bond to form the 3,4-dibromide or diiodide useful in preparing Grignard reagents which are useful in preparing compounds with substituents in these sites by reaction of the Grignard reagent with, for example, carbonyl compounds such as ketones, e.g., hexafluoroacetone, esters and aldehydes. These oxetane Grignard reagents cannot be prepared by the prior art processes for producing polyfluoro-oxetanes since the diiodo- and dibromo-difluoro ethylenes do not react readily with perhalofluoroacetones to form oxetanes. These new dibromo- and diiodo- compounds are useful in carrying out telomerization reactions with olefinic materials such as tetrafluoroethylene and hexafluoropropylene and result in the formation of telomerized polymers containing the polyfluoro oxetane moiety and having both oleophobic and hydrophobic properties as well as surface tension-reducing properties rendering the resulting polymers useful as textile impregnants which impart oil resistance water resistance, and stain resistance to the textile material.

The new polyfluoro-oxetenes of our invention are also useful in the preparation of mutual solvent-plasticizers for mixed fluorocarbons and hydrocarbons. As is well known, fluorocarbons and hydrocarbons are characteristically immiscible, and solvents for one group are usually non-solvents for the other group. We have found that the polyfluoro-oxetenes of our invention readily form adducts with normal alkanes of 3 to 14 carbon atoms to produce solids or high boiling liquids, soluble in a wide variety of hydrocarbons and fluorocarbons, including hexane, tolene, cyclohexane, 2,2,3-trichlorohexafluorobutane, perfluorobenzene, perfluorocyclohexane, etc. Such compounds are useful as lubricants and as solvents and/or plasticizers for polymeric materials such as polyvinylidene fluoride, polyvinyl fluoride, polyvinyl chloride, the polyacrylate mixtures of hydrocarbon, chlorocarbon polymers, and the like.

The following specific examples further illustrate our invention.

*Example 1.—Preparation of 2,2-bis(trifluoromethyl)-3,4-difluoro-oxetene*

A solution of 15.9 g. (0.0532 mol) of 2,2-bis(trifluoromethyl)-3,4-dichloro-3,4-difluoro-oxetane, B.P. 81.5–86° C., in 18 ml. of absolute methanol was added over a period of 50 minutes to a stirred suspension of 33 g. (0.505 g.-atom) of zinc and 0.1 g. of cupric chloride in 40 ml. of absolute methanol. The mixture was heated at 40–55° during the addition and then heated for two more hours at 43–55°. After standing overnight, the mixture was heated under reflux for 1.25 hours, and then the volatile product (12.4 g.) was distilled from the reaction mixture and collected in a Dry Ice trap. The product was fractionally distilled through a 5" column filled with glass helices. The product (11.2 g., 92.6%) had B.P. ca. 21–2° and was 99% pure on the basis of vapor phase chromatographic anaylsis. The resulting 2,2-bis(trifluoromethyl)-3,4-difluoro-oxetene of the formula

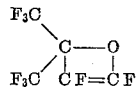

exhibited major infrared absorption bands at 5.45 microns (CF=CF), 7.3 microns, 7.49 microns, 7.62 microns, 7.73 microns, 8.03 microns, 8.14 microns, 8.27 microns, 8.45 microns, 8.53 microns, 10.23 microns, 13.92 microns.

*Example 2.—Preparation of 2,2-bis(trifluoromethyl)-3,4-dibromo-3,4-difluoro-oxetane*

A solution of 7 g. (.0438 mol) of bromine in 5 ml. of carbon tetrachloride was added dropwise to a stirred solution of 2 g. (.00876 mols) of 2,2-bis(trifluoromethyl)-difluoro-oxetene (prepared as described in Example 1 above) in 15 ml. of carbon tetrachloride heated at 40–47° and irradiated with a GE 275 watt sunlamp. Immediate decolorization occurred and the addition was continued until the bromine was in excess. The solution was cooled, diluted with additional carbon tetrachloride, washed once with 10% sodium thiosulfate solution, washed twice with water, and dried over sodium sulfate. Solvent was removed by distillation and the remaining 2,2-bis(trifluoromethyl)-3,4-dibromo-3,4-difluoro-oxetane product of the formula

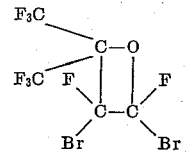

the amount being insufficient for distillation, exhibited infrared absorption bands at 5.83 microns, 7.39 microns, 7.70 microns, 7.77 microns, 8.00 microns, 8.10 microns, 8.27 microns, 8.45 microns, 8.75 microns, 9.05 microns, 9.28 microns, 9.50 microns, 9.98 microns, 10.25 microns, 10.85 microns, 11.45 microns, 11.70 microns, 14.08 microns, and 14.55 microns.

When a similar molar quantity of iodine is substituted for bromine in the above example, the corresponding 2,2-bis(trifluoromethyl)-3,4-difluoro-3,4-diiodo oxetane is obtained.

These dibromo and diiodo compounds readily form Grignard reagents by reaction with magnesium as follows:

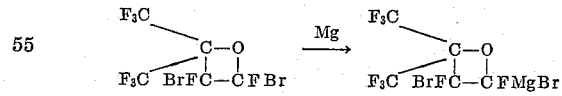

which react readily with carbonyl compounds, for example acetone in the presence of water to form the compound:

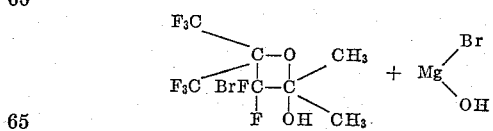

*Example 3.—Preparation of adduct of 2,2-bis(trifluoromethyl)-3,4-difluoro oxetene with n-hexane*

Five grams of 2,2-bis(trifluoromethyl)-3,4-difluoro oxetene were mixed with 250 ml. of cold (25° C.) n-hexane under an atmosphere of nitrogen. The solution was then irradiated for six hours at about 25° C. with ultraviolet light. The resulting reaction product was distilled to remove unreacted hexane leaving about 3 grams of residue. This residue on vacuum distillation boiled between about 50° C. and about 150° C. at 2 mm. pressure. A portion of the resulting product was analyzed for C, H, and F with results shown below:

Theoretical for 1:1 adduct: C, 42.1%; H, 4.46%; F, 48.4%. Found; C, 40.26%; H, 3.00%; F, 47.8%, indicating an empirical formula of $C_{11}F_8H_{14}O$.

Infrared spectrograms of the several portions of the product were run and were found to be identical, indicating that the adduct is a polymeric material. This spectrogram had characteristic absorption peaks at 3.3 microns, 5.4 microns, 7.4 microns, 7.8 microns, 8.2 microns, and 9.2 microns. The resulting adduct of 2,3-difluoro-4,4-bis(trifluoromethyl) oxetene with n-hexane was found to be miscible with n-hexane, toluene, cyclohexane, and 2,2,3-trichloro-heptafluorobutane.

While the above describes the preferred embodiments of our invention, it will be understood that departures can be made therefrom within the scope of the specification and claims.

We claim:
1. Polyfluoro-oxetenes of the formula

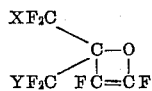

wherein X and Y are members selected from the group consisting of chlorine and fluorine.

2. 2,2-bis(trifluoromethyl)-3,4-difluoro-oxetene of the formula

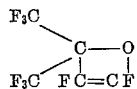

3. As a new composition of matter an adduct comprising equimolecular proportions of n-hexane and 2,2-bis-(trifluoromethyl)-3,4-difluoro oxetene having the empirical formula $C_{11}F_8H_{14}O$, an infrared spectrogram having characteristic absorption peaks at 3.3 microns, 5.4 microns, 7.4 microns, 7.8 microns, 8.2 microns, and 9.1 microns, having a boiling point within the range between about 50° C. and about 150° C. and being miscible with n-hexane, toluene, cyclohexane, and 2,2,3-trichloro-heptafluorobutane.

References Cited

Houben-Weyl, Methoden der Organischen Chemie, vol. 5/3 (1962), pp. 377, 384, 437.

NORMA S. MILESTONE, *Primary Examiner.*